United States Patent [19]
Dunn et al.

[11] Patent Number: 5,991,385
[45] Date of Patent: Nov. 23, 1999

[54] ENHANCED AUDIO TELECONFERENCING WITH SOUND FIELD EFFECT

[75] Inventors: James M. Dunn, Ocean Ridge, Fla.; Alan G. Ganek, Chappaqua, N.Y.; Edith H. Stern, Boca Raton, Fla.; Barry E. Willner, Briarcliff Manor, N.Y.

[73] Assignee: International Business Machines Corporation, Armonk, N.Y.

[21] Appl. No.: 08/896,285

[22] Filed: Jul. 16, 1997

[51] Int. Cl.[6] ..................................... H04M 3/42
[52] U.S. Cl. .................. 379/202; 379/67.1; 379/388; 379/389; 379/420; 381/1; 381/17; 381/61; 381/57
[58] Field of Search .................... 379/67.1, 202, 379/206, 388, 389, 420; 381/17, 61, 81, 57, 1

[56] References Cited

U.S. PATENT DOCUMENTS

| | | | |
|---|---|---|---|
| 4,232,198 | 11/1980 | Warman | 379/202 |
| 4,658,425 | 4/1987 | Julstrom | 381/81 |
| 4,734,934 | 3/1988 | Boggs | 379/202 |
| 5,020,098 | 5/1991 | Cell | 379/202 |
| 5,335,011 | 8/1994 | Addeo et al. | 348/15 |
| 5,572,591 | 11/1996 | Numazu et al. | 381/1 |
| 5,619,555 | 4/1997 | Fenton et al. | 379/67 |
| 5,742,688 | 4/1998 | Ogawa et al. | 381/17 |

*Primary Examiner*—Krista Zele
*Assistant Examiner*—Bing Bui
*Attorney, Agent, or Firm*—Morgan & Finnegan, LLP; J. C. Redmond, Jr.

[57] ABSTRACT

An audio teleconferencing apparatus and method provide an audio sound field among a plurality of teleconferencees creating a sense of a virtual conference table having a spatial location for each conferencee at the virtual table. Each conferencee has a speakerphone including a programmable Digital Signal Processor (DSP) for receiving a conference audio signal. In one form, the speakerphones are coupled to a conference bridge through individual ports, the bridge linking together all conferencees for purposes of the multiparty teleconference and transmitting port identifying signals denoting at discrete instants of time which remote port has a currently speaking conferences. The port identity signals are transmitted in-band or out-of-band to the speakerphones in conjunction with the conference audio signal. Each speakerphone uses the programmed DSP and the port identity signal/audio signals to cause sound reproduced at the speakerphone to appear to emanate from positions around the virtual conference table according to the port identity signals. In another form, a conference speakerphone exchanges its ID with other conference phones on the call and creates an "outgoing image" of participants at a speakerphone. Using the Id information, each DSP maps a virtual conference table for the conferencees and the relative spatial positions of the speakers within a group.

17 Claims, 5 Drawing Sheets

ENHANCED SPEAKERPHONE
REFERENCE DESIGN

TYPICAL CONFERENCE
CALL TODAY

AUDIO IMAGING
CONFERENCE CALL

ENHANCED SPEAKERPHONE
REFERENCE DESIGN

ENHANCED AUDIO TELECONFERENCING WITH SOUND FIELD EFFECT

BACKGROUND OF INVENTION

1. Field of Invention

This invention relates to teleconferencing systems. More particularly, the invention relates to audio teleconferencing systems which create a sound field effect of participants about a virtual conference table.

2. Description of the Prior Art

In today's environment, many businesses rely heavily on audio teleconferencing to conduct multi-party discussions from remote locations. These teleconferences are typically scheduled with the telephone company which reserves the required number of ports or incoming lines on an audio conference bridge located at a telephone company's switching office.

In the past few years, much attention has been paid to improving the conference speaker phones used in large conference rooms. These improvements have been built in to the conference room phones to help cancel room echoes, discriminate between several people speaking from different locations in the room, canceling feedback, and automatically enhancing the voice signal for optimal intelligibility. These improvements have been based on using a Digital Signal Processor (DSP) in the conference phone units or their supporting equipment. DSP's are, by design, software or firmware platforms for processing various analog signals such as voice and video waveforms. Thus, conference speaker phones have become software driven computer systems that specialize in encoding and decoding audio waveforms.

In order to create a more realistic sense of a virtual conference among the participants, a need exists to add a sound field effect to the conference phone capability to create a sense of spatial location among the participants, as if all the teleconference participants were seated around a virtual conference table.

Prior art related to teleconferencing with sound field effect is as follows:

U.S. Pat. No. 4,658,425 issued Apr. 14, 1987, discloses a microphone and loudspeaker arrangement for use in a teleconference system wherein a plurality of microphones are held in a fixed relationship to a loudspeaker. The microphones are independently gated ON in response to (1) speech picked up by the microphone, (2) a loudspeaker signal driving the loudspeaker, and (3) an electrical signal related to the microphone signal of the other associated microphones. A noise adapting threshold circuit generates a voltage level representative of background noise which is compared with the microphone signal of a respective microphone for determining whether the microphone is receiving speech. A decisional circuitry monitors the microphone signal of the associated microphone with respect to a MAX bus which carries microphone signals representative of the level of the microphone signals at the other microphones. The decisional circuitry generates a signal indicating that the associated microphone is the first loudest microphone signal.

U.S. Pat. No 4,734,934, issued Mar. 29, 1988, discloses a teleconferencing bridge which simulates the auditory spatial ambience of a face-to-face conference. The bridge uses a binaural approach to simulate spatial ambience.

U.S. Pat. No. 5,020,098, issued May 28, 1991, discloses a high-fidelity audio telephone conferencing arrangement which provides talker position information. Digitized high-fidelity audio is combined with digitized phase information, derived from talker position detecting circuitry in a local telephone station. The digitized high-fidelity audio is transmitted over the telephone channel to one or more remote telephone stations. A receiver in each remote station decodes the digital information and provides the high-fidelity audio signal to multiple spatially separated acoustic output devices. The digitized pulse information controls "panning" of the audio signal among the acoustic output devices. By varying the level of audio signal flowing to each acoustic device, the position of the talker can be created in a specific position in the remote listener sound field and the talker's identity thereby more easily determined. In addition, talker location information may be shared among multiple telephone stations participating in a telephone conference. Information as to the location of the talker along with the position of the talker is provided to each remotely located telephone station. The location of the talker is represented by the audio signal occurring in a designated general area of the remote listener's sound field and the position of the talker is represented by the creation of the audio signal in a specific position in this general area.

U.S. Pat. No. 5,335,011 issued Aug. 2, 1994, discloses a sound localization system for teleconferencing using self-steering microphone arrays. A microphone array covers a particular field which is divided into fixed, non-overlapping volume zones or sectors. Using the microphone array, when a sound is detected its source is located and a highly-directional beam is formed in the sector or zone containing the source of the sound. Only one beam is formed at any instant depending upon the location of the source of the sound. Thus, ambient noise, room reverberation, and acoustic coupling are greatly reduced. In addition to enhancing speech quality and reducing reverberation, noise and acoustic coupling the microphone array is capable of outputting a digital signal indicating which volume zone contains the source of the sound.

U.S. Pat. No. 5,619,555, issued Apr. 8, 1997, discloses an audio conferencing system in which conference participants interface with the system through a Graphical User Interface (GUI) computer program running on a remote computer or workstation. To join an audio conference in progress, a participant controls a GUI computer program to transmit a signal over a local area network to a central server. The central server, by examining database information, determines whether the participant is authorized to join the audio conference. If so, the central server controls a telephone system connected thereto and causes the telephone system to call the participant at a prelisted telephone number. The participant then joins the actual audio conference merely by answering the telephone.

None of the prior art discloses adding an audio imaging sound field to a conference phone to create a sound field effect of telephone conference participants using standard telephones and seated about a "virtual conference table" without the need for a telephone conference bridge to support the standard telephone on the conference.

SUMMARY OF THE INVENTION

An object of the invention is enhanced audio teleconferencing having a sound field effect of participants seated about a virtual conference table.

Another object is enhanced audio teleconferencing apparatus and method for creating a sense of a virtual conference table among participants at remote locations participating in a teleconference.

Another object is enhanced audio teleconferencing apparatus and method generating positional information correlated in time with audio information to identify conference participants in groups seated about a virtual conference table.

Another object is enhanced telephone conference apparatus and method which maps telephone conference participants into a spatial field to create a virtual conference table image.

Another object is enhanced telephone conference apparatus and method using standard telephones for teleconferencing and a Digital Signal Processor (DSP) powered conference phone to create a spatial map of the standard telephone about a "virtual conference table".

Another object is enhanced telephone teleconferencing apparatus and method which exchanges identification among teleconference participants using in-band or out-of-band signalling to map a virtual conference table of the participants.

Another object is enhanced telephone conference apparatus and method having data processing capabilities responsive to positional and audio information of teleconference participants to create an audio log of the teleconference.

These and other objects, features and advantages of the invention are best achieved in audio teleconferencing apparatus in which each participant participates in a teleconference through standard telephone including at one least one an enhanced speakerphone including a programmable Digital Signal Processor (DSP) which receives a conference audio signal. In one form, the enhanced speakerphone is coupled to a conference bridge through a port, the bridge linking together all participants for purposes of the teleconference. The conference bridge generates and transmits port identifying signals to which the speakerphones are connected. The port identity signals denote at discrete instances of time which remote port has a currently speaking participant. The port identity signals are transmitted in-band or out-of-band to the enhanced speakerphones in conjunction with the conference audio signal. Each speakerphone uses a programmed DSP responsive to the port identity/audio signals to cause sound reproduced at the speakerphone from the other conference participants to appear to emanate from positions around a virtual conference table according to the port identity signals.

In another form, the enhanced speaker or conference phone serving a group of speakers creates a map or "outgoing image" of its virtual table using directional microphones. The enhanced conference phone exchanges its "outgoing image" and identification with other conference phones included in the teleconference. Using the identification information, each DSP maps a virtual conference table for the location of the participants in the teleconference and the relative positions of the speakers within a group of participants.

In still another form, a computer with a sound card is substituted for the speakerphone or conference phone and uses the positional and audio signals to create an audio log of the teleconference. The addition of voice recognition to the computer further provides spearer identification for the audio log and a text database of the conference.

DESCRIPTION OF DRAWING

The invention will be further understood from the following detailed description of a preferred embodiment, taken in conjunction with the appended drawing in which.

DESCRIPTION OF PREFERRED EMBODIMENT

Figure 1:
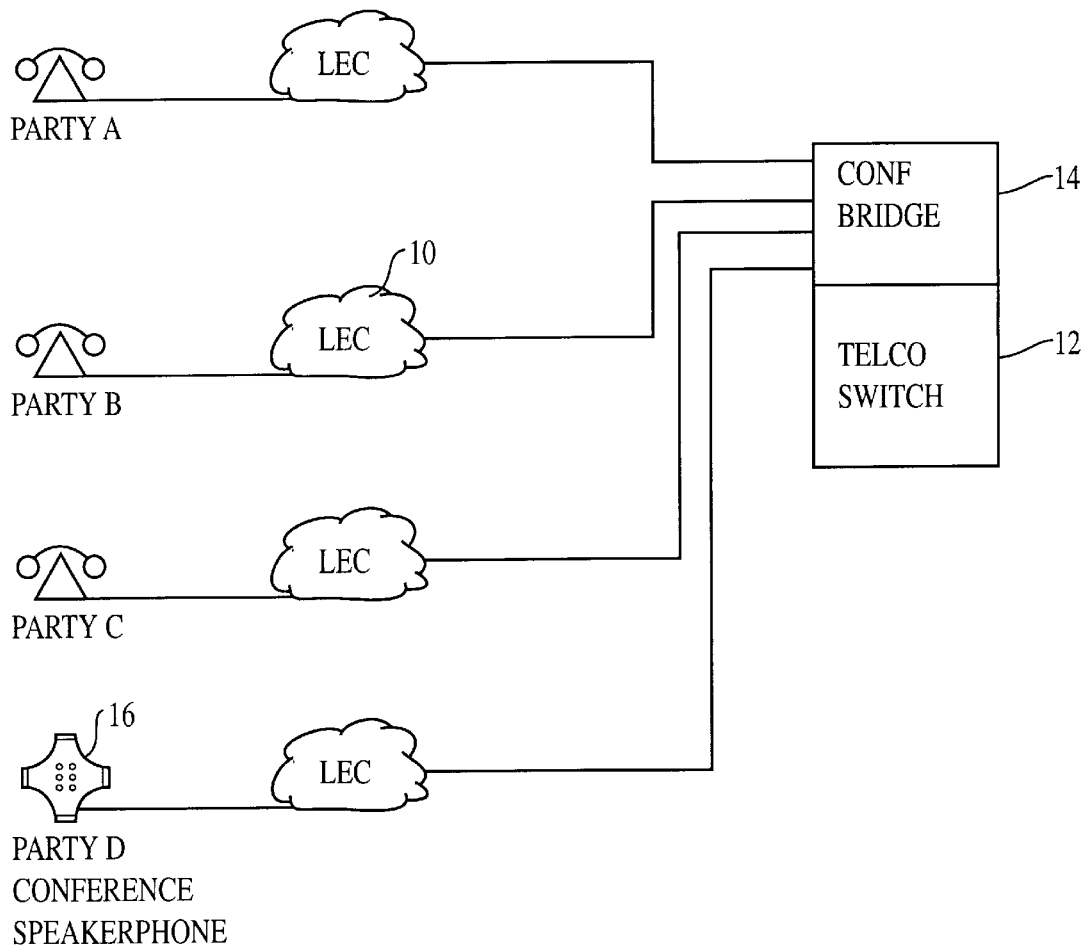
FIG. 1 is a representation of a prior art teleconference among a plurality of participants or parties at different location using enhanced speaker or conference phones.

In FIG. 1, a prior art audio teleconferencing system comprises a plurality of conference participants or parties, A-D, individually connected through their respective local exchange carriers (LEC) 10 to a telephone company switching center or central office 12 including a conference bridge 14. Typically, each party uses standard station equipment. However, one party, in this case party D, may use a speaker phone 16 for convenience or in the event a group of speakers are stationed at that conference location and wish to participate in the conference. A speakerphone is a telephone which includes a speaker and microphone for hands-free two-way conversation with the other parties in the conference. Conference speakerphones are well known in the prior art and shown, for example, in U.S. Pat. No. 4,400,584.

The conference bridge 14 contains electronics for amplifying and balancing each party's audio signals received through individual ports of the bridge so everyone can hear and speak to each other participating in the conference call. The conference call progress is monitored through the bridge 14 in order to produce a high quality conference and to maintain decent quality as parties enter or leave the teleconference. Conference bridges are well known in the prior art and described, for example, in U.S. Pat. No. 4,232,198, issued Nov. 4, 1980. The prior art audio teleconferencing system delivers a highly processed, but omni-directional teleconference. The omni-directional delivery does not provide the required audio ambience to create a sustainable sense of a "virtual conference". All parties or participants appear to "speak" from the same place.

Figure 2:
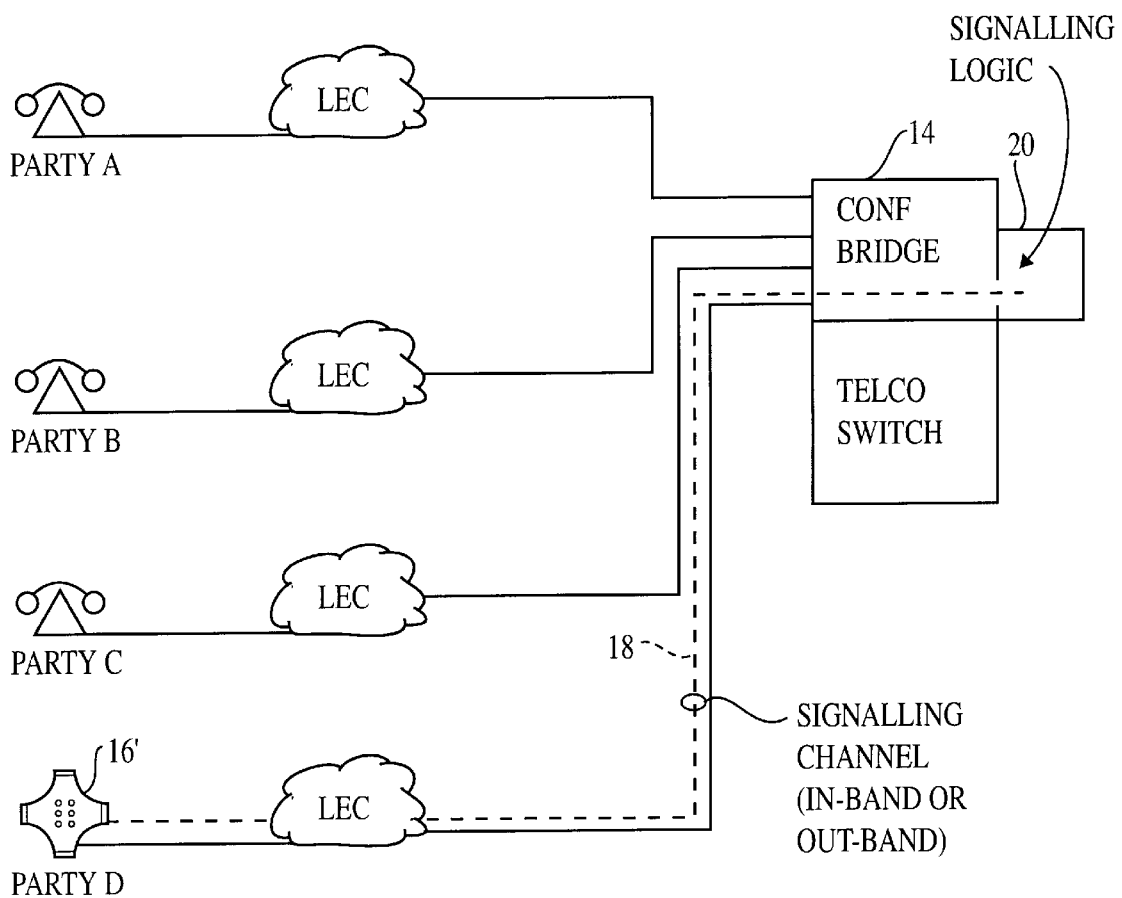
FIG. 2 is a representation of one embodiment of an improved audio teleconferencing apparatus incorporating the principles of the present invention and providing a sound field effect of conference participants or parties at different physical locations for each apparatus.

FIG. 2 modifies FIG. 1 to include a signal path 18 from the bridge 14 to an enhanced speakerphone 16'. The conference bridge 14 includes circuitry which, preferably, but not necessarily, mutes all circuits except the selected circuit for broadcast to the other party. Signalling logic 20 included in the conference bridge captures the identity of the circuit active at each point in time of the teleconference. The logic 20 sends the port identity signal which is a low bit rate data stream to the enhanced speakerphone 16'. The port identity signal may be sent in-band or out-of-band with respect to the audio signal transmitted by the bridge to all of the conference parties.

Figure 3:
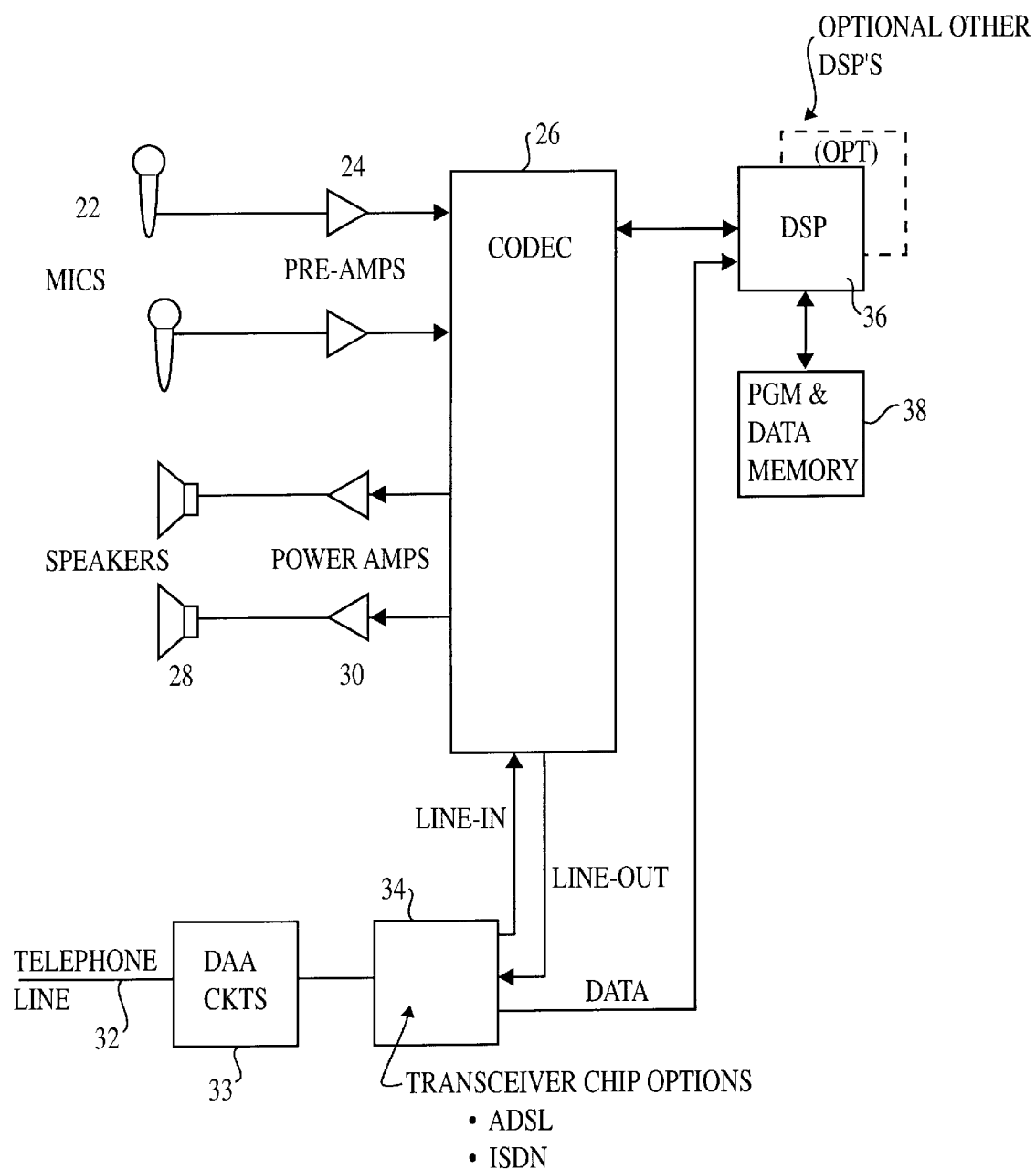
FIG. 3 is a block diagram of an enhanced speaker or conference phone responsive to alternate telephone line signalling in the audio teleconference apparatus of FIG. 2.

The enhanced conference phone includes a Digital Signal Processor (DSP) to process the low bit data rate stream sent to it by the conference bridge. The enhanced speakerphone, shown in FIG. 3, includes microphones 22 connected through preamplifiers 24 to a coder-decoder (codec) 26 which converts voice signals from their analog form to digital signals acceptable to the switching system. The coder-decoder 26 converts the digital signals from the switching system back to analog signals so that the party may hear and understand what the other parties are saying. In some systems the codec is in a Private Branch Exchange (PBX) and shared by many analog phone extensions which need not be speakerphones and other phone systems. Speakers 28 are also coupled to the codec through power amplifiers 30 to receive the analog signals from the codec and provide a voice output to the party. A telephone line 32 is connected to a Data Access Arrangement (DAA) circuit 33 which is coupled to a transceiver chip 34 adapted to work with any telephone signalling system, e.g., Asymmetrical Digital Signal Subscriber Line (ASDL) or Integrated Services Digital Network (ISDN) or the like. The transceiver 34 transmits the conference signals (audio and port identity signals) to a Digital Signal Processor (DSP) 36 through the codec 26. The DSP 36 includes programming stored in a data memory 38 for processing the port identity and audio signals received from the codec 28. The signals are processed by the DSP 36 in accordance with the programming in memory 38 to re-create the audio and the apparent speaker spatial location. The DSP maps the required number of active ports (speakers) into a spatial field to create a virtual conference table image. Using the DSP audio processing capability and a multi-loudspeaker output array, a sound field image can be created and manipulated as desired for party D using the conference or speaker phone 16', as described below.

In the prior art, microphones for standard speaker phones pick up the sound from various directions. These directions are governed heavily by their placement in the room (on the table) or by the mechanical design of the phone itself. Having 3 @ 120 degrees, or 4 @ 90 degrees, etc., is pretty standard. A DSP mixes these inputs, applies whatever signal shaping function it supports (such as echo cancelling) and then sends the combined analog wave shape out the phone line within the voice band. The far end receives the analog wave shape and recreates it, typically in non-aural, without verifying this is a different wave shape than the individual microphone had created.

In the present invention, the individual microphone pickup their respective analog signals. These signals since they are already spatially oriented (with or without care) create the virtual conference table since each covers a zone better than its neighbors, even if all pickup all of the room inputs. Each microphone picks up its area at 100%, and adjacent areas at less than 100%, and far areas even less yet.

The DSP code in the present invention measures these individual inputs to create a multiplier value and stores the value. The nature of this calculation would typically be a measurement of volume and power density, or possible several at different frequencies, or in a very powerful DSP, it could also be a frequency spectrum such as performed by a Fourier Analysis.

The analog inputs from the microphone are also sampled and mixed according to the supported waveform shaping method. This could be as simple as is done today, or complex sampling and encoding such as Dolby Surround 4:2:4 Sound or Dolby Pro-Logic, Dolby AC-3 algorithms. If complex techniques like Dolby are used, the encoding produces the front and rear, left and right intelligence to allow recreation of the sound field at the far end just like a stereo does today.

If the phones are sending the analog waveform, they also send the previously stored multiplier value via the inband or outband signalling methods. The far end receives the basic analog waveform and multiplier value, and uses the multiplier value to re-shape the basic waveform and send its' split parts to the various loudspeakers. This allows the far end to emphasize the directional components captured and calibrated by the near end. Using the multiplier value (per direction) also re-creates the original virtual table field.

If the phones are connected to a digital line, and all phones are enhanced speaker phones (See FIG. 4), then encoded samples of the near end signals can sent be directly from phone to phone. Interchange digitization formats such as Musical Device Digital Interface (MIDI), Motion Pictures Expert Group (MPEG, MPEG-2), etc., could be used.

It is believed apparent the same sound effect can be created for the parties A–C by substituting a speaker phone 16" for the standard telephone shown in FIG. 2 and receiving a port identity signal from the bridge 14.

Figure 4:
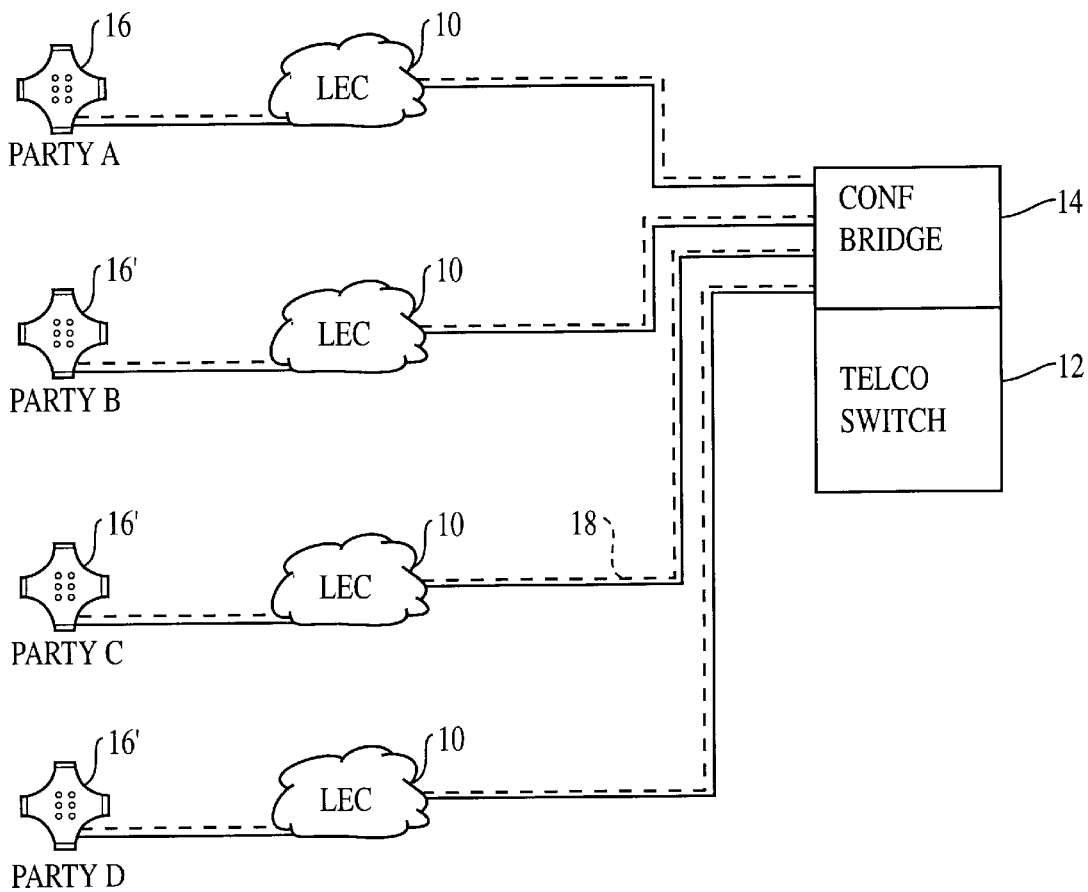
FIG. 4 is a representation of another embodiment of an improved audio teleconferencing apparatus incorporating the principles of the present invention using apparatus identification and "outgoing image" signals in providing a sound field effect of conference participants or parties at different physical locations and spatial location of speakers within each location for each apparatus.

FIG. 4 shows another system for creating a sound field effect for all the parties A–D without receiving a port identity signal from the bridge 14. In FIG. 4, each party A–D is coupled to the conference bridge 14 and Telco switch 12 through a conference or speaker phone 16'. Each speakerphone uses a standard or proprietary signalling scheme but still performs the basic functions described earlier. Each speakerphone creates an "outgoing image" of a virtual table of speakers or participants seated at the table according to a directional microphone. In addition, each speakerphone exchanges its identification (ID string for its telephone number) with other parties on the conference call. Thus, each conference phone maps a virtual table based for each location on the call. The data exchange among the parties is accomplished over the signalling channel which maybe in-band or out-of-band using the same line technologies ASDL/ISDN mentioned earlier. The DSP processing power enables each party to map not only the other locations around a virtual table, but each speakers' relative position within the group of speakers at a speakerphone. Again, the conference bridge 14 is not required to supply a port identify signal since the ID signal sent by each speakerphone is sufficient to generate a virtual table location of each participant and the "outgoing image" enables each speaker in a group to be identified.

In either the systems of FIG. 2 or FIG. 4, the use of either in-band or out-of-band signalling is backwards compatible with all types of existing telephones today. Therefore, non-enhanced telephones would not be able to use the advanced functions, but the advanced functions do not interfere with the basic telephony functions of the telephone. Conversely, enhanced speakerphones connected to non-enhanced conference bridges will not be able to use the feature of the systems shown in FIG. 2 but will work as standard phones. If all enhanced conference speakerphones are connected to a non-enhanced conference bridge, a system of FIG. 4 is created.

Figure 5:
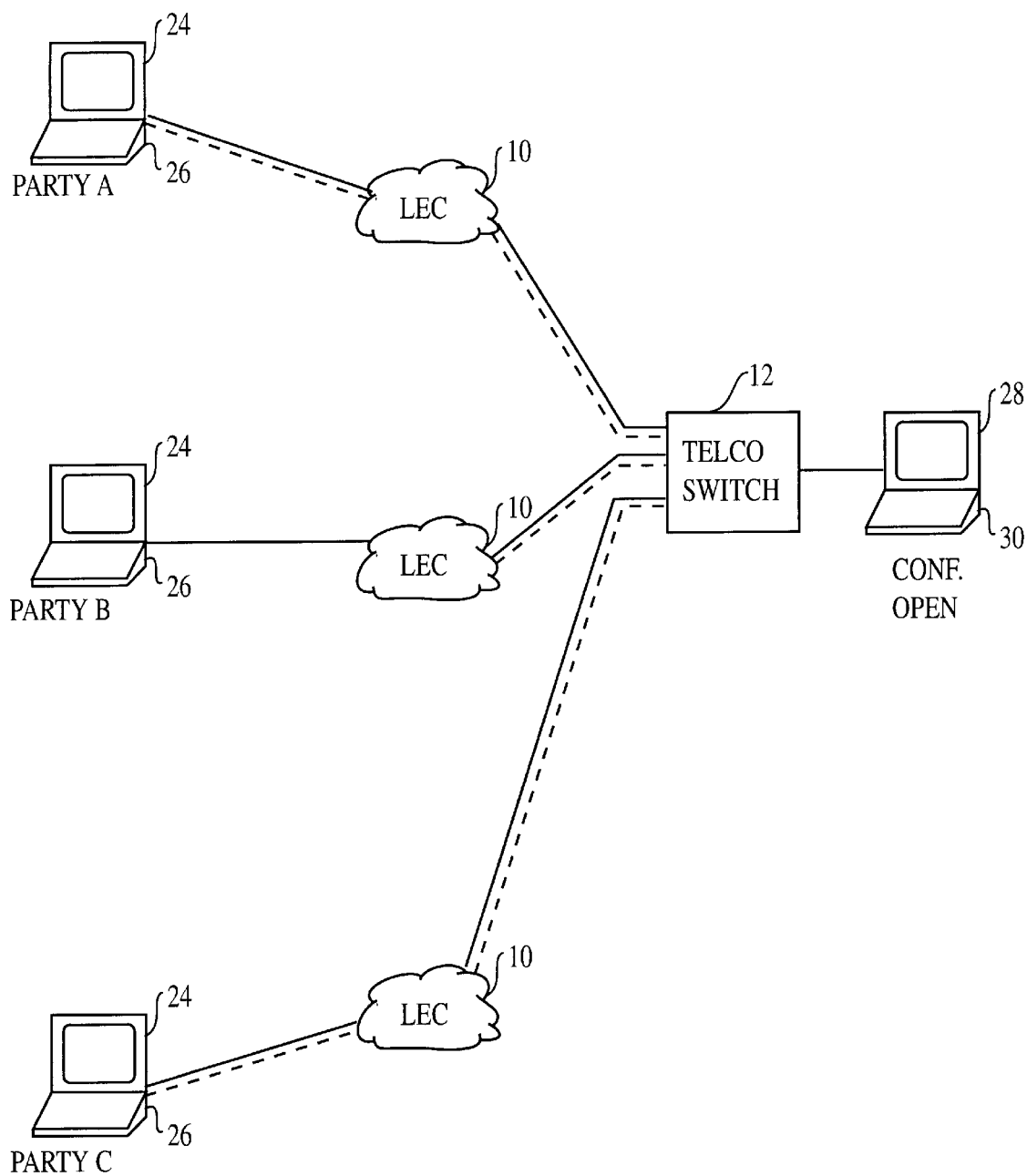
FIG. 5 is a representation of still another embodiment of an enhanced audio telephone teleconferencing apparatus incorporating the principles of the present invention and automatically providing a log of an audio teleconference of different speakers participating in the teleconference.

In FIG. 5, other functions can be added to the basic functions described for FIGS. 2 and 4, but depend upon the amount of processing power in the conference phone or its supporting equipment. If a conference phone is equipped for external speaker outputs (via standard audio connectors), a computer 24 and keyboard 26, such as a PC, with a sound card (not shown) can be substituted and attached to the LEC as shown in FIG. 5. A conference operator located at a computer 28 using a keyboard 30 to identify speakers as they announce themselves, can type in a name while the conference phone passed the audio signal and its location ID to the computer audio input. Thereafter, the conference speakerphone input (audio signal and location ID) can be processed by the computer as an audio log of the conference with location identification interspersed in the log.

If the computer is further equipped to do speaker independent voice recognition, then the audio log could contain not only the speaker ID based on caller location (as per the conference bridge port ID), but also the speaker identification within the location group, even for the conference phone without the capability mentioned in connection with FIG. 4. Other functional extensions may be included by using voice recognition in the computer to create not only an audio log, but can be converted to a text database and log of the conference. Voice recognition is not the limiting factor in recognizing the speaker, since the function assisted by the conference bridge information, or as limited by the capabilities of the conference phone if the system of FIG. 4 is used.

While the invention has been shown and described with respect to a preferred embodiment, various changes may be made in the form and spirit without departing from the scope of the invention as defined in the appended claims, in which:

We claim:

1. An audio teleconferencing apparatus with a sound field effect among participants comprising:
   a) telephone apparatus including at least one digital signal processor and generating a first signal in response to an audio input;
   b) means for linking the telephone apparatus in a teleconference with other telephone apparatus at other physical locations using a first signal path;
   c) means for generating a second signal in a second signal path identifying the telephone apparatus being used by a speaker in the teleconference; and
   d) means included in the digital signal processor using the first and second signals for creating the sound field effect of speaker locations about a virtual conference table.

2. The apparatus of claim 1 wherein the means for generating the second signal is a telephone conference bridge and the telephone apparatus is standard telephone, except for a sole speakerphone.

3. The apparatus of claim 1 further comprising means for generating an outgoing image of speaker spatial positions using the telephone apparatus.

4. The apparatus of claim 1 further comprising a conference bridge for generating the identification of telephone apparatus being used by a speaker in the teleconference.

5. The apparatus of claim 1 further comprising means for transmitting the first signal in the first signal path and the second signal is a data stream in the second signal path.

6. The apparatus of claim 5 further comprising means for denoting at discrete instants of time in the data stream which telephone apparatus has a currently talking speaker.

7. The apparatus of claim 5 wherein the data stream is transmitted in an out-of-band signal path with respect to the first signal path.

8. The apparatus of claim 5 wherein the data stream is transmitted in an in-band signal path with respect to the first signal path.

9. The apparatus of claim 1 wherein the telephone apparatus is a conference speakerphone and includes means for exchanging its identification with other conference speakerphones on the teleconference call using the second signal path.

10. The apparatus of claim 8 further comprising means using the digital signal processor for mapping a virtual conference table for the conference speakerphones in response to the first and second signals.

11. The apparatus of claim 1 wherein the telephone apparatus is a computer with a sound card and further comprises means for inputting to the computer an audio signal and an identification of the computers in the teleconference.

12. The apparatus of claim 9 further comprising means for preparing an automatic log of the teleconference using the computer in conjunction with the audio and identification signals.

13. The apparatus of claim 9 further including speech recognition means in the computer and maintaining an audio log of the teleconference.

14. The apparatus of claim 10 further including a text data base and log of the teleconference.

15. In an audio teleconferencing system including telephone apparatus including a digital signal processor, the apparatus being linked together in a teleconference, a method for creating a sound field effect for the teleconference, comprising the steps of:
    a) generating a first signal from the telephone apparatus in a first signal path in response to an audio input;
    b) generating in a second signal path an identification signal of the telephone apparatus being used by a speaker in the teleconference; and
    c) processing the first and identification signals in the telephone apparatus and creating the sound field effect of speaker locations about a virtual conference table.

16. The method of claim 15 further comprising the steps of:
    a) generating an outgoing image of speaker spatial positions using the telephone apparatus.

17. An article of manufacturing, comprising:
    a computer usable medium having computer readable program code means embodied therein for creating a sound field effect for an audio teleconference in an audio teleconferencing system including telephone apparatus including a digital signal processor, the apparatus being linked together in a teleconference, the computer readable program code means in said article of manufacturing, comprising:
    a) program code means for generating a first signal from the telephone apparatus in a first signal path in response to an audio input;
    b) program code means for generating in a second signal path an identification signal of the telephone apparatus being used by a speaker in the teleconference; and
    c) program code means for processing the first and identification signals in the telephone apparatus and creating the sound field effect of speaker locations about a virtual conference table.

* * * * *